US011795090B1

(12) United States Patent
Ecker et al.

(10) Patent No.: US 11,795,090 B1
(45) Date of Patent: *Oct. 24, 2023

(54) METHOD FOR PROCESSING OF SEWAGE SLUDGE USING PYROLYSIS TO ELIMINATE PFAS AND OTHER UNDESIRABLE MATERIALS

(71) Applicant: WM INTELLECTUAL PROPERTY HOLDINGS, L.L.C., Houston, TX (US)

(72) Inventors: James W. Ecker, Brunswick, ME (US); Lindsay D'Anna, Mount Vernon, NH (US); Eric Myers, Houston, TX (US)

(73) Assignee: WM INTELLECTUAL PROPERTY HOLDINGS, L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,732

(22) Filed: Sep. 2, 2022

Related U.S. Application Data

(63) Continuation of application No. 17/220,733, filed on Apr. 1, 2021, now Pat. No. 11,434,160.

(60) Provisional application No. 63/073,265, filed on Sep. 1, 2020.

(51) Int. Cl.
| | | |
|---|---|---|
| *C02F 11/10* | (2006.01) | |
| *C01B 32/05* | (2017.01) | |
| C02F 101/34 | (2006.01) | |
| C02F 101/32 | (2006.01) | |
| C02F 101/36 | (2006.01) | |

(52) U.S. Cl.
CPC .............. *C02F 11/10* (2013.01); *C01B 32/05* (2017.08); *C02F 2101/322* (2013.01); *C02F 2101/34* (2013.01); *C02F 2101/36* (2013.01)

(58) Field of Classification Search
USPC ........................................................ 210/757
See application file for complete search history.

(56) References Cited

U.S. PATENT DOCUMENTS

| | | | |
|---|---|---|---|
| 4,502,969 | A | 3/1985 | Shell |
| 4,618,735 | A * | 10/1986 | Bridle .................... C02F 11/10 585/240 |
| 7,686,084 | B2 | 3/2010 | Reddy et al. |
| 8,003,578 | B2 | 8/2011 | Monroe et al. |
| 8,637,717 | B2 | 1/2014 | MacKay et al. |
| 9,725,643 | B2 | 8/2017 | De Wolf et al. |
| 11,339,337 | B1 | 5/2022 | Newman et al. |
| 11,365,362 | B2 | 6/2022 | Joly et al. |
| 11,413,668 | B2 | 8/2022 | Brady |
| 11,434,160 | B1 | 9/2022 | Ecker |
| 2006/0014648 | A1 | 1/2006 | Milson et al. |
| 2008/0078545 | A1 | 4/2008 | Welton et al. |
| 2016/0272873 | A1 | 9/2016 | Mahadevan et al. |
| 2017/0351237 | A1 | 12/2017 | Presezzi et al. |
| 2019/0390804 | A1 | 12/2019 | Presezzi et al. |
| 2020/0079989 | A1 | 3/2020 | Ramirez Angulo et al. |
| 2020/0123433 | A1 | 4/2020 | Farmer et al. |
| 2020/0155885 | A1 | 5/2020 | Strathmann et al. |
| 2020/0197903 | A1 | 6/2020 | Turner |
| 2020/0216771 | A1 | 7/2020 | White |
| 2020/0261847 | A1 | 8/2020 | Wan et al. |
| 2020/0362219 | A1 | 11/2020 | Lesar et al. |
| 2020/0369941 | A1 | 11/2020 | Deville et al. |
| 2021/0032552 | A1 | 2/2021 | Mooney |
| 2021/0207033 | A1 | 7/2021 | Shah et al. |
| 2022/0185701 | A1 | 6/2022 | Duckworth et al. |
| 2022/0411698 | A1 | 12/2022 | Shah et al. |

FOREIGN PATENT DOCUMENTS

| | | |
|---|---|---|
| CN | 109777388 | 5/2019 |
| EP | 2860450 | 12/2016 |
| WO | 2010/150272 | 12/2010 |
| WO | 2014/131087 | 9/2014 |
| WO | 2016/071877 | 5/2016 |
| WO | 2018/148118 | 8/2018 |
| WO | 2019/050716 | 3/2019 |
| WO | 2019/227162 | 12/2019 |
| WO | 2020/073092 | 4/2020 |
| WO | 2020/113004 | 6/2020 |
| WO | 2021/193573 | 9/2021 |
| WO | 2022/051587 | 3/2022 |
| WO | 2022/067440 | 4/2022 |

OTHER PUBLICATIONS

Racek et al., Biochar—Recovery Material from Pyrolysis of Sewage Sludge: A Review, 11 Waste Biomass Valori., 3677, 3677-3709 (published online Apr. 20, 2019) (Year: 2019).*
Particle Size: The size of dust particles, pollen, bacteria, virus and many more, EngineeringToolBox.com, https://www.engineeringtoolbox.com/particle-sizes-d_934.html (last visited Jul. 18, 2023) (Year: 2023).*
Thoma et al.; Pyrolysis Processing of PFAS-Impacted Biosolids, a Pilot Study; J Air Waste Manag Assoc; 14 pages; Apr. 2022.
Gao et al.; Thermochemical conversion of sewage sludge: A critical review; Progress in Energy and Combustion Science, 79; 98 pages; 2020.
Patentscope; ITMI20130853—System and Method for Treatment of Sewage Sludge by Bioforecetech Corp.; 6 pages; printed Aug. 6, 2020.
Bioforcetech Corporation; Eliminating PFAS From Biosolids is No Longer a Mystery; Sep. 21, 2019; 6 pages.
Petrie, Bruce et al.; A Review on Emerging Contaminants in Wastewaters and the Environment: Current Knowledge, Understudied Areas and Recommendations for Future Monitoring; Water Research, Apr. 2015; pp. 3-27.

(Continued)

*Primary Examiner* — Hayden Brewster
(74) *Attorney, Agent, or Firm* — Greenberg Traurig LLP

(57) ABSTRACT

A system and method for processing sewage sludge using pyrolysis to eliminate and/or significantly reduce organic chemical compounds, including plastics, and to produce a biochar product that is safe for beneficial uses is provided. The system and method can utilize pyrolysis to treat sewage sludge which dramatically reduces or eliminates regulated and unregulated synthetic organic chemical compounds in the resultant biochar.

15 Claims, No Drawings

(56) References Cited

OTHER PUBLICATIONS

Concawe; Environmental Fate and Effects of Poly- and PerFluoroaklyl Substances (PFAS), prepared for the Soil and Groundwater Taskforce by Arcadis; Report No. 8/16; Jun. 2016; 121 pages; Network for Industrially Contaminated Land in Europe.

Lee, Linda S. et al.; PFAS—More Than You Ever Wanted to Know and Then Some; Purdue University, presentation at 2019 WEF Residuals & Biosolids Conference; Mar. 13, 2019; 44 pages.

Lazcano, Rooney Kim et al.; Per- and Polyfluoroalkyl Substances in Commercially Available Biosolid-Based Fertilizers: The Effect of Post-treatment Processes; WEF/IWA Residuals and Biosolids Conference 2019; 20 pages; 2019.

Paz-Ferreiro, Jorge et al.; Biochar from Biosolids Pyrolysis: A Review; 16 pages; May 10, 2018; International Journal of Environmental Research and Public Health.

Gao, Ningbo et al.; Progress in Energy and Combustion Scient, Thermochemical Conversion of Sewage Slude: A Critical Review; Feb. 26, 2020; 39 pages; Elsevier Ltd.

Kucharzyk, Katarzyna H. et al.; Journal of Environmental Management, Novel Treatment Technologies for PFAS Compounds: A Critical Review; Aug. 8, 2017; 13 pages; Elsevier Ltd.

Ajema, Leta; Effects of Biochar Application on Beneficial Soil Organism Review; 2018; International Journal of Research Studies in Science, Engineering and Technology, vol. 5, Issue 5, pp. 9-18.

Silvani, Ludovica et al.; Sicent of the Total Environment: Can Biochar and Designer Biochar be Used to Remediate Per- and Polyfluorinated Alkyl Substances (PFAS) and Lead and Antimony Contaminated Soils?; Science Direct; vol. 694; Dec. 1, 2019; 4 pages.

Gould, E.D. et al.; Developments in the Use of Dense Brines as Packer Fluids; Drilling and Production Practice; Jan. 1, 1961; 4 pages; U.S.

Dong, Shiqi et al.; Steel Corrosion Inhibition by Calcium Nitrate in Halide-Enriched Completion Fluid Environments; Material Degradation; Sep. 13, 2018; 9 pages.

Al-Taq, Ali A. et al.; First Successful Filtercake Damage Removal Treatment Utilizing In-Situ Nitrogen/Heat Generating System for Relatively Heavy Oil Wells; Oct. 27, 2017; SPE Annual Technical Conference and Exhibition; 4 pages.

Surti, Jay et al.; PFAS in Biosolids: State of Knowledge and Treatment Opportunities; NEWEA Conference: Sustainable Biosolids management—Sure Bet!; Oct. 18, 2019; 32 pages; Hazen.

\* cited by examiner

METHOD FOR PROCESSING OF SEWAGE SLUDGE USING PYROLYSIS TO ELIMINATE PFAS AND OTHER UNDESIRABLE MATERIALS

BACKGROUND

1. Related Applications

This application is a continuation application of, and claims the benefit of, U.S. application Ser. No. 17/220,733, filed Apr. 1, 2021, which claims the benefit, and priority benefit, of U.S. Provisional Patent Application Ser. No. 63/073,265, filed Sep. 1, 2020, the disclosure and contents of which are incorporated by reference herein in their entirety.

2. Field of Invention

This invention relates generally to processing of sewage sludge using pyrolysis to eliminate and/or significantly reduce organic chemical compounds.

3. Description of the Related Art

Sewage sludge is the settled solids resulting from the treatment of wastewater. Federal and state laws allow the beneficial use of sewage sludge if the material is treated to reduce or destroy pathogens and if defined concentrations for specific analytes are not exceeded. Federal regulations for the beneficial use of sewage sludge (see, e.g., 40 CFR Part 503) regulate the reduction of pathogens, vectors and nine (9) heavy metals. If the sewage sludge is treated to meet the standards for beneficial use, the resulting material is commonly referred to as "biosolids." Some individual states have more stringent requirements and regulations for specific elements or organic chemical compounds known to be health or environmental risks, while many states do not have requirements beyond the federal standards.

Even if sewage sludge is treated to meet applicable regulatory standards, currently almost all forms of beneficial use of sewage sludge involve some form of agronomic land application regardless of the treatment. Beneficial use programs for sewage sludge have been hampered for decades due to presence, or suspected presence, of regulated organic chemical compounds or unregulated organic chemical compounds. Unregulated organic chemical compounds are often referred to as "compounds of emerging concern" (CECs). Examples of such CECs include organic chemical compounds such as VOCs, SVOCs, perfluoroalkyl substances (PFAS), polybrominated flame retardants (PBDE), dioxin, pharmaceuticals and personal care products (PPCPs) and any other organic chemical compounds that may be detectable in wastewater, and therefore often present in the treated sewage sludge. Some VOCs and SVOCs are also indicative of the presence of particles of plastics in sewage sludge, a growing problem in treated sewage sludge for beneficial use.

Treated sewage sludge has been used on farmland and other land as a soil amendment and fertilizer for decades (agronomic land application). In the United States, approximately 60% of the sewage sludge generated is recycled by land application. There is concern regarding whether treated sewage sludge products with detectable levels of regulated organic chemical compounds or CECs could impact soil quality, surface water or groundwater. For example, groundwater used for drinking water could exceed the EPA's health advisory levels, or other limits set by states or local jurisdictions.

Other uses for sewage sludge products include non-agronomic uses, such as a solid fuel for energy generation, as a component of building materials, and other uses. The presence, or suspected presence, of regulated organic chemical compounds or CECs may also hamper the use or development of sewage sludge products in these applications.

Another emerging concern is the presence of plastics in treated sewage sludge. Plastics are another set of synthetic organic chemical compounds which are not currently regulated by the EPA and the majority of states. Plastic contamination in sewage sludge is often categorized based on size (macroplastics>5 mm, microplastics 1 μm–5 mm, and nanoplastics<1 m). During wastewater treatment, most plastics are diverted to the solids settlement and treatment processes through various liquid stream processes, causing them to accumulate in the sewage sludge. Treated sewage sludge that is land applied spreads these plastics into the environment. Since most plastics are not biodegradable, they can cause widespread negative impacts to wildlife and the environment and have been known to bioaccumulate in the food chain.

In recent years, there has been an increased interest in studying the effects of per- and poly-fluoroalkyl substances on humans. These substances (often referred to as "PFAS" or other related compounds) are manufactured chemicals that can be found in various consumer and industrial products. PFAS compounds are wholly man-made and are not created by any naturally occurring environmental processes.

PFAS are sometimes referred to as "forever chemicals" because the molecules are characterized by a chain of strong fluorine-carbon bonds which result in a highly stable and long persisting chemicals. It is believed that long term human exposure to PFAS can increase the risk of cancer, increase cholesterol levels, affect the immune system, and interfere with hormone levels.

Commonly used sewage sludge treatment methods to create biosolids, including composting, lime stabilization and heat-drying can meet federal and state standards for beneficial use, but may not reduce, or reduce significantly, levels of regulated organic chemical compounds or CECs. For example, it is known in the art that these previous treatment efforts do not reduce or eliminate PFAS compounds. In some instances, concentrations of PFAS compounds have been demonstrated to increase through the previous treatment processes. Therefore, these previous treatment efforts have proven to be ineffective and/or inefficient, and do not provide satisfactory results with the treatment of sewage sludge. Similar disadvantages exist for treatment efforts for other regulated organic chemical compounds and CECs.

Improvements in this field are therefore desired.

SUMMARY

The following presents a simplified summary of the disclosed subject matter in order to provide a basic understanding of some aspects thereof. This summary is not an exhaustive overview of the technology disclosed herein.

In certain illustrative embodiments, a method of treating sewage sludge to produce a biochar product is provided. Sewage sludge of at least 70% total solids content can be subjected to pyrolysis at a temperature of at least 400 degrees C. for a minimum of 15 minutes, whereby a biochar product is produced that is essentially free of regulated and unregulated organic chemical compounds including plastics. The pyrolysis can also be conducted at a temperature of at least 580 degrees C. The organic chemical compounds can include PFAS. The organic chemical compounds can include plastics. The organic chemical compounds can be from the group consisting of PFAS, VOCs, SVOCs, PBDEs, dioxins, pharmaceuticals and personal care products. The sewage sludge to be pyrolyzed can have at least 90% total solids content. The pyrolysis can be conducted at a temperature of at least 580 degrees C. and the sewage sludge can be pyrolyzed for a minimum of 30 minutes. The pyrolysis can be performed using indirect heating in the form of conduction. The pyrolysis can be conducted at a heat transfer reaction rate of 100° C./min or lower. The pyrolysis can be conducted using a continuous processing mechanism that allows the reaction process to continue uninterrupted and continuously feed sewage sludge while simultaneously removing biochar. The continuous processing mechanism can include a screw or a conveyance. The pyrolysis can be conducted using particle sizes in the range from dust-sized particles to 1.25". The method can be performed with no addition of catalysts to the reaction materials. The method can be performed with no addition of inert gases to the reaction materials.

In certain illustrative embodiments, a method of treating sewage sludge to produce a biochar product is also provided. The sewage sludge can be subjected to pyrolysis using a continuous feed stream and a heat transfer reaction rate of 100° C./min or lower, whereby a biochar product is produced that is essentially free of regulated and unregulated organic chemical compounds including plastics, and wherein there is no addition of catalysts to the reaction materials.

DETAILED DESCRIPTION

Various illustrative embodiments of an improved system and method for processing sewage sludge using pyrolysis to eliminate and/or significantly reduce organic chemical compounds, including plastics, and to produce a biochar product that is safe for beneficial uses are disclosed herein.

In certain illustrative embodiments, the presently disclosed system and method utilize pyrolysis to treat sewage sludge which dramatically reduces or eliminates regulated and unregulated synthetic organic chemical compounds in the resultant biochar.

Pyrolysis is a thermal process that converts complex-carbon-containing materials at high temperature (typically >400 degrees C.) in the absence of oxygen to create several potential products: syngas, pyrolysis oils, and/or biochar. Pyrolysis is closely related to gasification but distinguished by the absence of oxygen in the process (gasification uses small amounts of air containing oxygen). The range of products produced from pyrolysis depends on specific operating conditions, primarily temperature, and can be tailored to favor certain products. The liquid fraction, also referred to as py-oil, can be burned for energy in industrial boilers or can be added to anaerobic digestion systems to increase biogas generation. The solid product from biomass pyrolysis (including treated sewage sludge), called biochar, is a carbon rich product that has been demonstrated to have significant and growing value in agricultural and horticultural applications, as well as non-agronomic applications, including its use as a filtration media, as component of building materials, as a component in the manufacture of biopolymers, a substitute in applications for carbon black and other uses.

A representative example of pyrolysis equipment that can be utilized to treat sewage sludge and other biomass materials (e.g., food processing wastes, agricultural wastes and woody biomass), thus converting these materials to energy and producing a biochar product, is the P-Series Pyrolysis system manufactured by Pyreg GmbH, and available from Bioforcetech Corporation of Redwood City, California. Other examples of pyrolysis equipment that can utilized to treat sewage sludge include Kore Infrastructure, Biogreen (a division of ETIA Group), and Technotherm SA.

The presently disclosed use of pyrolysis to treat sewage sludge has been determined to create a biochar product essentially free of regulated and unregulated organic chemical compounds of concern (CECs), including VOCs, SVOCs, PFAS, PBDEs, and dioxin, as well as to destroy plastics that may be present in the sewage sludge since the melting point of plastics are under 300 degrees C. and pyrolysis process operates at a minimum of 400 degrees C. For example, when sewage sludge containing elevated PFAS levels are pyrolyzed, PFAS are eliminated from the biochar (i.e. not detected). It is believed that the PFAS may potentially be destroyed by the pyrolysis process and/or vaporized through the pyrolysis process and/or absorbed in associated carbon filtration systems treating air emissions.

Similar to PFAS, indicator compounds for plastics, some VOCs and SVOCs, such as ethylbenzene, styrene and bis (2-ethylhexyl) phthalate, present in treated sewage sludge at elevated levels have been found to be eliminated from the biochar (i.e. not detected). It is known that plastics present in the sewage sludge are destroyed by the pyrolysis process given the high operating temperatures relative to the melting point for even the most heat resistant plastic compounds.

Experimental Testing

Samples of sewage sludge were treated to determine if organic chemical compounds were destroyed or eliminated through the pyrolysis process. Sewage sludge was collected and tested for over 100 organic chemical compounds, including VOCs, SVOCs, PFAS, PBDEs, dioxin, pharmaceuticals and personal care products to establish a baseline. Sewage sludge was then sent to a pyrolysis facility to undergo a pyrolysis process. Biochar, the resulting product from pyrolysis, was then sent to an analytical laboratory for testing. Results were compared, and organic chemical compound destruction was evaluated.

Sewage sludge was sourced from existing thermal drying operations that treat sewage sludge. All sewage sludge was at a minimum of 90% total solids and met the EPA 40 Part 503 Class A criteria, although it is believed that sewage sludge can be successfully pyrolyzed at as low as 70% total solids. Furthermore, the sewage sludge does not need to be treated to meet EPA 40 Part 503 Class A criteria since the pyrolysis process will achieve that standard for the finished biochar.

Multiple sewage sludge samples were collected over time from a wastewater plant and pyrolyzed into biochar using a lab scale pyrolysis unit. Three (3) composite samples of both pre-pyrolysis sewage sludge and post-pyrolysis biochar were taken over a 3-month period. The six (6) samples were tested for over 100 regulated organic compounds and CECs using a detailed protocol to ensure accuracy of the results. Included among the tested-for components were: TS, TVS, pH, % Carbon, N series, P (soluble and total), K, Ca, Conductivity, and EPA 503 metals. Furthermore, the six (6) samples were tested for organic chemical compounds including VOCs, SVOCs, Pharmaceuticals, Personal Care Products, PBDEs, PFAS and Dioxins. Several of the VOCs and SVOCs tested are indicators of the presence of plastics.

All sample collection, transport and analyses were performed using standard techniques and methods as published by the USEPA in the SW-846 Compendium or similar industry accepted publications to ensure sample integrity and test method accuracy. All laboratories used for sample analysis are accredited facilities and used the highest quality control and quality assurance techniques to ensure test results were accurate.

The pyrolysis process was run at 600 degrees Celsius for approximately 30 minutes, although it is believed that the same results could be achieved at a temperature above 400 degrees C. and as little as 15-minute detention time.

Testing instructions for sample A-1 were as follows:

1. Sample to be pyrolyzed for a minimum of 30 minutes at 600 degrees C.

2. Weigh and record weight of sample before and after pyrolysis. Record temperatures as well. Transmit results with finished sample back to requestor.

3. Pyrolyze as much of the sample provided as possible to ensure a minimum of 2 liters of finished sample are obtained ("A-2").

4. Use only stainless steel, decontaminated equipment for transferring sample from containers into sample containers provided.

Input Material: Sewage sludge at >90% solid content.

Pyrolysis Conditions: Temperature 600 degrees C. +/−20 degrees C. (1,112 degrees F. +/−68 degrees F.), Residence time ~15-30 Minutes The testing results are shown in Table 1 hereto.

TABLE 1

PRE and POST PYROLYSIS ANALYTICAL RESULTS

| Class | Compound | Units | Test A Pre-Pyrolysis A-1 | Test A Post-Pyrolysis A-2 | Test B Pre-Pyrolysis B-1 | Test B Post-Pyrolysis B-2 | Test C Pre-Pyrolysis C-1 | Test C Post-Pyrolysis C-2 | Reduction Level Achieved Through Pyrolysis Process |
|---|---|---|---|---|---|---|---|---|---|
| VOCs | Methylene chloride | ug/kg (dry wt.) | 820* | 12.0 | 850* | 4.7 | 570 | 500 | eliminated |
| | Tetrachloroethene | | 0.65 | 4.1* | 1.1 | 0.47 | 57 | 50 | NQ |
| | Benzene | | 4.3* | 1.2 | 13.0* | 0.47 | 57 | 1,600* | eliminated |
| | Toluene | | 15.0* | 2.4 | 34* | 0.94 | 500* | 100 | eliminated |
| | Ethylbenzene | | 1.4* | 2.4 | 2.1* | 0.94 | 110 | 100 | eliminated |
| | Chloromethane | | 5.2 | 9.4 | 8.6 | 3.8 | 460 | 2,500* | NQ |
| | p/m-Xylene | | 3.4* | 4.7 | 5.2* | 1.9 | 230 | 200 | eliminated |
| | Xylenes Total | | 3.4* | 2.4 | 5.2* | 0.94 | 110 | 100 | eliminated |
| | Styrene | | 4.0* | 2.4 | 16.0* | 0.94 | 110 | 100 | eliminated |
| | Acetone | | 4,100* | 24 | 14,000* | 20 | 10,000* | 1,000 | eliminated |
| | Carbon disulfide | | 66* | 24 | 180* | 9.4 | 1,100 | 1,000 | eliminated |
| | 2-Butanone | | 1,400* | 24 | 4,700* | 9.4 | 3,400* | 1,000 | eliminated |
| | 4-Methyl-2-pentanone | | 13.0* | 24 | 82* | 9.4 | 1,100 | 1,000 | eliminated |
| | sec-Butylbenzene | | 1.3 | 2.4 | 2.9* | 0.94 | 110 | 100 | eliminated |
| | p-Isopropyltoluene | | 18.0* | 2.4 | 12,000* | 0.94 | 7,100 | 100 | eliminated |
| SVOCS | 2,6-Dinitrotoluene | ug/kg (dry wt.) | 4,900 | 500 | 4,300 | 500 | 520 | 490 | NQ |
| | Fluoranthene | | 3,400* | 300 | 2,600 | 300 | 1,200* | 300 | eliminated |
| | Bis(2-ethylhexyl) Phthalate | | 36,000* | 500 | 31,000* | 500 | 15,000* | 490 | eliminated |
| | Benzo(a)anthracene | | 2,900 | 300 | 2,600 | 300 | 350* | 300 | eliminated |
| | Benzo(b)fluoranthene | | 2,900 | 300 | 2,600 | 300 | 650* | 300 | eliminated |
| | Chrysene | | 2,900 | 300 | 2,600 | 300 | 560* | 300 | eliminated |
| | Phenanthrene | | 2,900 | 300 | 2,600 | 300 | 680* | 300 | eliminated |
| | Pyrene | | 2,900 | 300 | 2,600 | 300 | 990* | 300 | eliminated |
| | Phenol | | 38,000* | 500 | 18,000* | 500 | 13,000* | 490 | eliminated |
| | 3-Methylphenol/ 4-Methylphenol | | 13,000* | 720 | 8,700* | 720 | 5,100* | 710 | eliminated |
| PFAS | PFBA | ug/kg (dry wt.) | 0.528* | 0.962 | 0.587* | 0.995 | 0.964 | 0.948 | NQ |
| | PFBS | | 0.665* | 0.962 | 0.753* | 0.995 | 0.964 | 0.948 | NQ |
| | PFINA | | 2.260* | 0.962 | 2.240* | 0.995 | 2.20* | 0.948 | eliminated |
| | PFOA | | 1.110* | 0.962 | 1.010* | 0.995 | 0.964 | 0.948 | eliminated |
| | PFNA | | 1.040* | 0.962 | 0.793 | 0.995 | 0.964 | 0.948 | eliminated |
| | PFOS | | 37.30* | 0.962 | 28.60* | 0.995 | 26.60* | 0.948 | eliminated |
| | PFDA | | 1.60* | 0.962 | 1.340* | 0.995 | 1.310* | 0.948 | eliminated |
| | NMeFOSAA | | 4.90* | 0.962 | 4.210* | 0.995 | 4.670* | 0.948 | eliminated |
| | PFUnA | | 1.20* | 0.962 | 1.020* | 0.995 | 1.030* | 0.948 | eliminated |
| | FOSA | | 0.715* | 0.962 | 0.750* | 0.995 | 0.964 | 0.948 | NQ |
| | NEtFOSAA | | 3.780* | 0.962 | 3.80* | 0.995 | 3.630* | 0.948 | eliminated |
| | PFDoA | | 1.130* | 0.962 | 1.060* | 0.995 | 1.000* | 0.948 | eliminated |
| | PFTA | | 0.552* | 0.962 | 0.520 | 0.995 | 0.964 | 0.948 | NQ |
| | PFOA/PFOS, Total | | 38.40* | 0.962 | 29.60* | 0.995 | 26.60* | 0.948 | eliminated |
| PCDD | Dioxin | ng/kg TEQ | 9.18* | 0.003* | 6.47* | 0.016* | 7.37* | 1.37* | 94%* |
| PBDEs | BDE-28 + 33 | ug/kg (dry wt.) | 1.980* | 0.000* | 1.840* | 0.000 | 2.310* | 0.000 | 99.98%* |
| | BDE-47 | | 95.8* | 0.012* | 79.4* | 0.006* | 99.3* | 0.006* | 99.99%* |
| | BDE-99 | | 51.9* | 0.009 | 54* | 0.006* | 83.5 | 0.004* | 99.99%* |
| | BDE-100 | | 18.1* | 0.002 | 17.0* | 0.001* | 20.4* | 0.001* | 99.99%* |
| | BDE-153 | | 10.6* | 0.001* | 8.790* | 0.001 | 9.3* | 0.001 | 99.99%* |

TABLE 1-continued

PRE and POST PYROLYSIS ANALYTICAL RESULTS

| Class | Compound | Units | Test A Pre-Pyrolysis A-1 | Test A Post-Pyrolysis A-2 | Test B Pre-Pyrolysis B-1 | Test B Post-Pyrolysis B-2 | Test C Pre-Pyrolysis C-1 | Test C Post-Pyrolysis C-2 | Reduction Level Achieved Through Pyrolysis Process |
|---|---|---|---|---|---|---|---|---|---|
| | BDE-154 | | 7.28* | 0.001 | 7.150* | 0.001 | 7.5 | 0.000 | eliminated |
| | BDE-183 | | 2.27* | 0.001 | 2.0* | 0.001 | 2.3* | 0.000 | eliminated |
| | BDE-209 | | 637* | 0.116 | 716* | 0.024* | 654* | 0.031 | eliminated |
| PPCPs | Bisphenol A | ug/ | 1,250* | 836 | 1,250* | 856 | 1,280* | 969 | eliminated |
| | Furosemide | kg | 66.2 | 66.9 | 65.8 | 68.5 | 64.1 | 77.5 | NQ |
| | Gemfibrozil | (dry | 332* | 2.51 | 321* | 2.57 | 294* | 2.91 | eliminated |
| | Glipizide | wt.) | 9.93 | 10.0 | 9.87 | 10.3 | 9.61 | 11.6 | NQ |
| | Glyburide | | 4.97 | 5.02 | 4.93 | 5.14 | 4.81 | 5.81 | NQ |
| | Hydrochlorothiazide | | 33.1 | 33.4 | 32.9 | 34.2 | 32.0 | 38.8 | NQ |
| | 2-Hydroxy-ibuprofen | | 132 | 134 | 132 | 137 | 128 | 155 | NQ |
| | Ibuprofen | | 192* | 25.1 | 193* | 25.7 | 168* | 29.1 | eliminated |
| | Naproxen | | 13.90* | 5.02 | 20.40* | 5.14 | 18.1* | 5.81 | eliminated |
| | Triclocathan | | 2,460* | 5.02 | 2,330* | 5.14 | 2,850* | 5.81 | eliminated |
| | Triclosan | | 3,260* | 100 | 3,020* | 103 | 4,510* | 116 | eliminated |
| | Warfarin | | 2.48 | 2.51 | 2.47 | 2.57 | 2.4 | 2.91 | NQ |
| | Acetaminophen | | 44.5* | 25.1 | 35.3* | 25.7 | 42.9* | 29.1 | eliminated |
| | Azithromycin | | 1,130* | 2.5 | 600* | 2.57 | 1,090* | 2.91 | eliminated |
| | Caffeine | | 237* | 25.1 | 225* | 25.7 | 165* | 29.1 | eliminated |
| | Carbadox | | 2.48 | 2.5 | 2.47 | 2.57 | 2.4 | 2.91 | NQ |
| | Carbamazepine | | 62.5* | 2.5 | 51.3* | 2.57 | 58.7* | 2.91 | eliminated |
| | Cefotaxime | | NQ | NQ | NQ | 10.3 | NQ | 11.6 | NQ |
| | Ciprofloxacin | | 3,690* | NQ | 2,470* | 43.8 | 1,960* | 16.8 | eliminated |
| | Clarithromycin | | 13.7* | 2.5 | 6.1* | 2.57 | 22.5* | 2.91 | eliminated |
| | Clinafloxacin | | 37.1 | NQ | 19.8 | NQ | 21.7 | 46.3 | NQ |
| | Cloxacillin | | 4.97* | 5.0 | 4.93 | 5.14 | 4.81 | 5.81 | NQ |
| | Dehydronifedipine | | 8.7* | 1.0 | 7.92* | 1.03 | 7.9* | 1.16 | eliminated |
| | Diphenhydramine | | 617* | 1.0 | 646* | 1.03 | 649* | 1.16 | eliminated |
| | Diltiazem | | 11.7* | 0.5 | 13.2* | 0.514 | 11.9* | 0.581 | eliminated |
| | Digoxin | | 43.4 | 10.0 | 62.7* | 10.3 | 134 | 11.6 | eliminated |
| | Digoxigenin | | 33.2 | 12.9 | 18.8 | 10.3 | 36.5 | 11.6 | NQ |
| | Enrofloxacin | | 13.9* | NQ | 11.1* | NQ | 5.76* | 5.81 | NQ |
| | Erythromycin-H2O | | 6.16* | 3.9 | 5.67* | 3.94 | 5.58* | 4.46 | eliminated |
| | Flumequine | | 2.48 | 2.5 | 2.47 | 2.57 | 3.1 | 2.91 | NQ |
| | Fluoxetine | | 302* | 2.5 | 279* | 2.57 | 273* | 2.91 | eliminated |
| | Lincomycin | | 6.56* | 5.0 | 6.39* | 5.14 | 4.81 | 5.81 | eliminated |
| | Lomefloxacin | | 5.56 | NQ | 5.1 | NQ | 4.81 | 21.6 | NQ |
| | Miconazole | | 483* | 2.5 | 318* | 2.57 | 403* | 2.91 | eliminated |
| | Norfloxacin | | 51.1* | NQ | 216 | NQ | 38 | 55.5 | NQ |
| | Norgestimate | | 13.9 | 5.0 | 7.68 | 5.14 | 4.81 | 5.81 | NQ |
| | Ofloxacin | | 1,810* | NQ | 1,300* | NQ | 1,070* | 5.29* | 99.50%* |
| | Ormetoprim | | 0.993 | 1.0 | 0.987 | 1.03 | 0.961 | 1.16 | NQ |
| | Oxacillin | | 4.97 | 5.0 | 4.93 | 5.14 | 4.81 | 5.81 | NQ |
| | Oxolinic Acid | | 58.1 | 56.9 | 57.7 | 1.03 | 56.5 | 1.16 | NQ |
| | Penicillin G | | 4.97 | 5.0 | 4.93 | 5.14 | 4.81 | 5.81 | NQ |
| | Penicillin V | | 4.97 | 5.0 | 4.93 | 5.14 | 4.81 | 5.81 | NQ |
| | Roxithromycin | | 5.42 | 0.5 | 0.493 | 0.514 | 8.49 | 0.581 | NQ |
| | Sarafloxacin | | 24.8 | NQ | 24.7 | NQ | 24 | 46.9* | NQ |
| | Sulfachloropyridazine | | 19.1 | 2.5 | 7.54 | 2.57 | 2.4 | 2.91 | NQ |
| | Sulfadiazine | | 2.48 | 2.5 | 2.47 | 2.57 | 2.4 | 2.91 | NQ |
| | Sulfadimethoxine | | 0.497 | 0.5 | 0.493 | 0.83 | 4.82 | 0.822 | NQ |
| | Sulfamerazine | | 5.58 | 1.0 | 1.9 | 1.03 | 0.961 | 1.16 | NQ |
| | Sulfamethazine | | 0.993 | 1.3 | 0.987 | 1.18 | 27.2 | 1.16 | NQ |
| | Sulfamethizole | | 0.993 | 1.0 | 0.987 | 1.03 | 7.99 | 1.16 | NQ |
| | Sulfamethoxazole | | 11.4 | 1.0 | 6.04 | 1.03 | 17.8 | 1.16 | NQ |
| | Sulfanilamide | | 24.8 | 25.1 | 24.7 | 25.7 | 24 | 29.1 | NQ |
| | Sulfathiazole | | 6.71 | 2.5 | 3.0 | 2.57 | 2.4 | 2.91 | NQ |
| | Thiabendazole | | 120 | 2.5 | 116 | 2.57 | 100 | 2.91 | NQ |
| | Trimethoprim | | 3.23 | 2.5 | 2.88 | 2.57 | 2.4 | 2.91 | NQ |
| | Tylosin | | 9.93 | 10.0 | 9.87 | 10.3 | 9.61 | 11.6 | NQ |
| | Virginiamycin M1 | | 4.97 | 5.0 | 4.93 | 5.14 | 4.81 | 5.81 | NQ |
| | 1,7-Dimethyixanthine | | 99.3 | 100 | 113 | 103 | 126 | 116 | NQ |

KEY
1. Results in bold type with an asterisk (*) are the reported results, i.e. the analyte was found at a concentration above the laboratory detection limit. All other results (non-bold type) were non-detect (ND), indicating the analyte was not found in the sample tested. The non-bold figures are the laboratory detection limit.
2. "Eliminated" = the analyte was found at a known concentration Pre-Pyrolysis in the sewage sludge, and was Non-Detectable Post-Pyrolysis in the Biochar.
3. "NQ" = Non-Quantifiable. Unable to determine reduction level due to high laboratory detection limit concentration, or non-quantifiable concentration, in at least one of the samples tested.

In the categories of VOC, SVOC, PFAS, PBDE, Dioxin, and Pharmaceuticals and Personal Care Products, over 105 compounds were tested for in the treated sewage sludge and resulting biochar product. In the treated sewage sludge, 66 of the 105 compounds were found at elevated concentrations above detection levels in the treated sewage sludge in at least two of the three composite samples tested, which indicates a notable and very significant presence of these regulated and unregulated compounds in sewage sludge. Of the 66 compounds found in the treated sewage sludge pre-pyrolysis, 59 of these compounds (including all VOCs, SVOCs and PFAS compounds detected, and many of the pharmaceuticals and personal care products) were reduced to below the laboratory detection limits in the finished biochar samples, so these compound categories, including plastics, were effectively destroyed or eliminated through pyrolysis process and not present in the biochar. Of the 7 remaining compounds found above detection levels in at least one of three composite samples post-pyrolysis, all 7 compounds were significantly reduced through the process. Compounds found reduced and percent reduction is as follows: Dioxin=94% reduction; PBDEs=99.9% reduction; and only one pharmaceutical (Ofloxian, an antibiotic medication)=99.5% reduction.

These results demonstrate and prove that the concentrations of all organic chemical compounds detected and quantifiable in the sewage sludge were dramatically reduced or non-detectable in the resultant biochar. A non-detectable concentration level in biochar for a specific compound indicates the compound was effectively not present and eliminated by the process in the resultant biochar.

The detection level, or non-detect level, is the lowest quantity of a substance that can be distinguished from the absence of that substance from the laboratory blank with a very high degree of confidence. The non-detect level can vary sample to sample under the strict quality control testing conditions required for the approved test method. Some variability in detection level among different samples analyzed is not unusual, and in fact typical given the limits of modern analytical chemistry.

In certain illustrative embodiments, the presently disclosed system and method can be performed using pyrolysis under one or more of the following reaction conditions: (i) indirect heating of the sewage sludge, specifically conduction; (ii) a heat transfer reaction rate (i.e., the rate at which heat is transferred to the sewage sludge feedstock in degrees/min) of 100° C./min or lower, which is typically considered to be "slow" pyrolysis; (iii) continuous feed of sewage sludge into the pyrolysis reactor chamber; (iv) particle sizes of sewage sludge feedstock in the range from dust-sized particles to 1.25"; and (v) no addition of catalysts or inert gases to the reaction. Operation under these conditions will still result in concentrations of organic chemical compounds and CECs in the sewage sludge that are dramatically reduced or non-detectable in the resultant biochar.

By comparison, existing technologies utilized to destroy, or potentially destroy, some compounds of emerging concern typically utilize one or more of direct heating (e.g., fluidized beds), fast pyrolysis (greater than 100° C./min), batch methods and/or batch retort reactors, milling of the sewage sludge feedstock to achieve a very small particle size (e.g., ground into sawdust), and addition of catalysts (for carbon deposition) or inert gases (for reactor purging and process management) during treatment.

The presently disclosed system and method have several advantages over prior art technologies. For example, the creation of a biochar product from sewage sludge which has de minimus to no detectable presence of regulated organic chemicals and unregulated CECs can dramatically increase both the economic value and public acceptance of the produced material. Prior methods for treating sewage sludge to meet regulatory standards for agronomic beneficial use include, e.g., lime stabilization, composting and heat drying. Also, many of these prior methods have long been known to reduce certain compounds to some extent through biodegradation and/or heat. However, none of these methods necessarily destroy or eliminate all regulated compounds and unregulated CECs, and many compounds, such as PFAS, are particularly resistant to degradation or destruction using these common treatment methods. For example, research in recent years has found PFAS present in untreated and treated sewage sludge products, in some cases increasing in concentration through treatment, raising significant concerns about the safe use of treated sewage sludge products from these common treatment processes. While these other regulatory approved sewage sludge treatment processes may reduce some regulated and unregulated organic compounds, none of those processes significantly reduce or eliminate all organic compounds and CECs. Pyrolysis appears to dramatically reduce or eliminate the tested organic chemical compounds without exception.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

What is claimed is:

1. A method of treating a sewage sludge to produce a biochar product, the method comprising: subjecting the sewage sludge to pyrolysis at a temperature of at least 400 degrees C. for a minimum of 15 minutes and subjecting air emissions from the pyrolysis to carbon filtration treatment, whereby a biochar product is produced that is essentially free of PFAS,
    wherein the sewage sludge has at least 70% total solids content,
    and wherein the pyrolysis is slow pyrolysis performed using indirect heating in the form of conduction at a heat transfer reaction rate of 100° C./min or lower using a continuous processing mechanism comprising a screw or a conveyance that allows the reaction process to continue uninterrupted while continuously feeding sewage sludge and simultaneously removing biochar,
    and wherein there is no addition of catalysts or inert gases to the sewage sludge.

2. The method of claim 1, wherein the pyrolysis is conducted at a temperature of at least 580 degrees C.

3. The method of claim 1, wherein the sewage sludge to be pyrolyzed has at least 90% total solids content.

4. The method of claim 1, wherein the pyrolysis is conducted at a temperature of at least 580 degrees C. and the sewage sludge is pyrolyzed for a minimum of 30 minutes.

5. The method of claim 1, wherein the biochar product is essentially free of plastics.

6. A method of treating a sewage sludge to produce a biochar product, the method comprising: subjecting the sewage sludge to pyrolysis at a temperature of at least 400 degrees C. for a minimum of 15 minutes and absorbing PFAS from air emissions from the pyrolysis, whereby a biochar product is produced that is essentially free of PFAS,
   wherein the sewage sludge has at least 70% total solids content,
   and wherein the pyrolysis is slow pyrolysis performed using indirect heating in the form of conduction at a heat transfer reaction rate of 100° C./min or lower using a continuous processing mechanism comprising a screw or a conveyance that allows the reaction process to continue uninterrupted while continuously feeding sewage sludge and simultaneously removing biochar,
   and wherein there is no addition of catalysts or inert gases to the sewage sludge.

7. The method of claim 6, wherein the pyrolysis is conducted at a temperature of at least 580 degrees C.

8. The method of claim 6, wherein the sewage sludge to be pyrolyzed has at least 90% total solids content.

9. The method of claim 6, wherein the pyrolysis is conducted at a temperature of at least 580 degrees C. and the sewage sludge is pyrolyzed for a minimum of 30 minutes.

10. The method of claim 6, wherein the biochar product is essentially free of plastics.

11. A method of treating a sewage sludge to produce a biochar product, the method comprising: subjecting the sewage sludge to pyrolysis at a temperature of at least 400 degrees C. for a minimum of 15 minutes and filtering PFAS from air emissions from the pyrolysis, whereby a biochar product is produced that is essentially free of PFAS,
    wherein the sewage sludge has at least 70% total solids content,
    and wherein the pyrolysis is slow pyrolysis performed using indirect heating in the form of conduction at a heat transfer reaction rate of 100° C./min or lower using a continuous processing mechanism comprising a screw or a conveyance that allows the reaction process to continue uninterrupted while continuously feeding sewage sludge and simultaneously removing biochar,
    and wherein there is no addition of catalysts or inert gases to the sewage sludge.

12. The method of claim 11, wherein the pyrolysis is conducted at a temperature of at least 580 degrees C.

13. The method of claim 11, wherein the sewage sludge to be pyrolyzed has at least 90% total solids content.

14. The method of claim 11, wherein the pyrolysis is conducted at a temperature of at least 580 degrees C. and the sewage sludge is pyrolyzed for a minimum of 30 minutes.

15. The method of claim 11, wherein the biochar product is essentially free of plastics.

* * * * *